United States Patent [19]

Sakai et al.

[11] Patent Number: 5,572,008
[45] Date of Patent: Nov. 5, 1996

[54] OPTICAL INFORMATION READING APPARATUS WITH CONCAVE MIRROR

[75] Inventors: Yasuyuki Sakai, Kariya; Katsunori Goto, Handa, both of Japan

[73] Assignee: Nippondenso Co., Ltd., Kariya, Japan

[21] Appl. No.: 357,124

[22] Filed: Dec. 15, 1994

[30]    Foreign Application Priority Data

Dec. 16, 1993   [JP]   Japan .................................. 5-316575

[51] Int. Cl.$^6$ ........................................................ G06K 7/10
[52] U.S. Cl. ........................................... 235/467; 235/462
[58] Field of Search .................................. 235/462, 472,
   235/467, 454; 359/868, 869, 864, 859, 858

[56]               References Cited

U.S. PATENT DOCUMENTS

| | | | |
|---|---|---|---|
| 4,575,625 | 3/1986 | Knowles | 235/467 |
| 4,967,074 | 10/1990 | von Stein | 250/236 |
| 4,971,410 | 11/1990 | Wike, Jr. | 359/17 |
| 5,157,248 | 10/1992 | Barkan | 235/472 |
| 5,179,271 | 1/1993 | Lindacher | 235/467 |
| 5,202,784 | 4/1993 | Reddersen | 359/196 |
| 5,430,285 | 7/1995 | Karpan | 235/472 |

FOREIGN PATENT DOCUMENTS

| | | |
|---|---|---|
| 63-149775 | 6/1988 | Japan . |
| 63-150775 | 6/1988 | Japan . |
| 2161578 | 6/1990 | Japan . |

*Primary Examiner*—Donald T. Hajec
*Assistant Examiner*—Karl Frech
*Attorney, Agent, or Firm*—Cushman Darby & Cushman, L.L.P.

[57]                ABSTRACT

An optical information reading apparatus has an optical system which includes a concave mirror. The concave mirror has first and second concave portions and a planar portion. Reflection optical axes of the first and second concave portions are set offset relative to a reflection optical axis of the planar portion. This makes it possible to arrange a light source and a light-receiving sensor with a given proper interval therebetween in a longitudinal direction of the apparatus so that a thickness of the apparatus can be reduced. The first concave portion may form a portion of a first ellipsoidal surface of revolution and the second concave portion may form a portion of a second ellipsoidal surface of revolution. The first and second ellipsoidal surfaces share a rotation axis and focal points located at conjugate points on the rotation axis. The first concave portion is located closer to a rotating mirror than the second concave portion, and diameters of the second ellipsoidal surface are set greater than those of the first ellipsoidal surface. This also contributes to reducing the thickness of the apparatus.

9 Claims, 7 Drawing Sheets

OPTICAL INFORMATION READING APPARATUS WITH CONCAVE MIRROR

BACKGROUND OF THE INVENTION

1. Field of the Invention

The present invention relates to optical information reading apparatus for reading optical information, such as, a bar code, and more specifically, to optical information reading apparatus that can reduce a thickness of an optical system included therein and thus an overall thickness of the optical information reading apparatus.

2. Description of the Prior Art

Optical information reading apparatuses have been known, wherein a laser beam emitted from a light source is reflected by a rotating mirror to become a scanning light which is then applied via a pattern mirror onto an object to be read, such as, a label bearing an optical information, for instance, a bar code, so as to scan the optical information. In these systems light reflected from the read object is converged, via the pattern mirror and the rotating mirror, onto a light-receiving surface of a light-receiving sensor (photodiodes) which then converts the received light representative of an image of the scanned optical information into an electric signal depending on an intensity of the received light.

Japanese First (unexamined) Patent Publication No. 63-150775 shows one type of the optical systems used in the conventional optical information reading apparatuses. As shown in FIG. 9A, the optical system includes a ceiling mirror 105 arranged at a position obliquely above a rotating mirror 103 which is rotationally driven by an electric motor 101. A laser beam A emitted from a light source (not shown) is conducted via a through hole 107a formed in a condenser lens 107 to the ceiling mirror 105 where the laser beam A is reflected and incident onto the rotating mirror 103 from obliquely above. The incident laser beam A is reflected by the rotating mirror 103 in a horizontal direction to become a scanning light B which is then reflected by a pattern mirror 109 and applied or irradiated onto a bar code 113 via a reading window 111 of the optical information reading apparatus. A signal light C reflected on the bar code 113 is incident onto the rotating mirror 103 via the pattern mirror 109 and then reflected toward the ceiling mirror 105. The signal light C is further reflected by the ceiling mirror 105 and converged onto a light-receiving sensor 115 via the condenser lens 107.

However, in the shown optical system, since the signal light C reflected by the ceiling mirror 105 is a divergent light, the condenser lens 107 is required to be larger in size than the ceiling mirror 105, and an optical path to the light-receiving sensor 115 is required to be longer. Further, the condenser lens 107 is required to be perforate for the laser beam A to pass therethrough. Moreover, the light-receiving sensor 115 and the light source for the laser beam are required to be arranged close to each other.

On the other hand, the foregoing Japanese First Patent Publication No. 63-150775 also shows another type of conventional optical system. As shown in FIG. 9B, the optical system includes, instead of the ceiling mirror 105, a reflection hologram 120 having a light converging function. This structure is advantageous in, for example, that the condenser lens 107 in FIG. 9A is not required.

However, since the hologram has wavelength selectivity for its diffraction efficiency and wavelength dependency for its diffraction angle, a semiconductor laser which is effective for size reduction can not be used as a light source. Specifically, since the semiconductor laser changes a wavelength of emitting light depending on a variation in temperature thereof, when the wavelength of emitted light deviates from a design wavelength band, the diffraction efficiency of the hologram is largely reduced, and further, the light from the hologram is not precisely converged onto the light-receiving sensor 115 due to a change in the diffraction angle of the hologram. This causes insufficiency in intensity of the signal light which reaches the light-receiving sensor 115.

SUMMARY OF THE INVENTION

Therefore, it is an object of the present invention to provide an optical information reading apparatus having an improved optical system. The optical system uses a concave mirror having a planar portion so as to make it possible to reduce a thickness of the system while the system is free of influence Which would be otherwise caused due to a variation in laser beam wavelength.

According to one aspect of the present invention, an optical information reading apparatus comprises an irradiating optical system for converting a laser beam emitted from a light source to a scanning light using a rotating mirror and for applying the scanning light onto an object to be read via a pattern mirror, the object bearing an optical information. A condensing optical system converges a reflected light from the object onto a given focal point via the pattern mirror and the rotating mirror; light-receiving means, arranged at the given focal point, produces a light-receiving signal indicative of an intensity of the reflected light converged by the condensing optical system. Recognition means reads the optical information based on the light-receiving signal from the light-receiving means. The irradiating and condensing optical systems include a concave mirror arranged near the rotating mirror, the concave mirror having a planar portion for reflecting the laser beam emitted from the light source to be incident on the rotating mirror and a concave portion for reflecting and converging the reflected light from the rotating mirror onto the light-receiving means arranged apart from the light source.

According to another aspect of the present invention, an optical information reading apparatus comprises a light source for emitting a laser beam. An optical system, including a concave mirror, for applying the laser beam onto an optical information and converges a reflected light from the optical information onto a given focal point. Light-receiving means, arranged at the given focal point, receives the converged reflected light and produces an electric signal indicative of an intensity of the received reflected light. A recognition circuit reads the optical information based on the electric signal from the light-receiving means. The concave mirror has a planar portion for reflecting the laser beam emitted from the light source and a concave portion for reflecting and converging the reflected light from the optical information onto the light-receiving means. The planar portion has a reflection optical axis which is offset relative to a reflection optical axis of the concave portion.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings.

DESCRIPTION OF THE PREFERRED EMBODIMENT

Now, an optical information reading apparatus according to a preferred embodiment of the present invention will be described with reference to the accompanying drawings. In the preferred embodiment, the present invention is applied to an overhead-type bar code reader.

Figure 1:
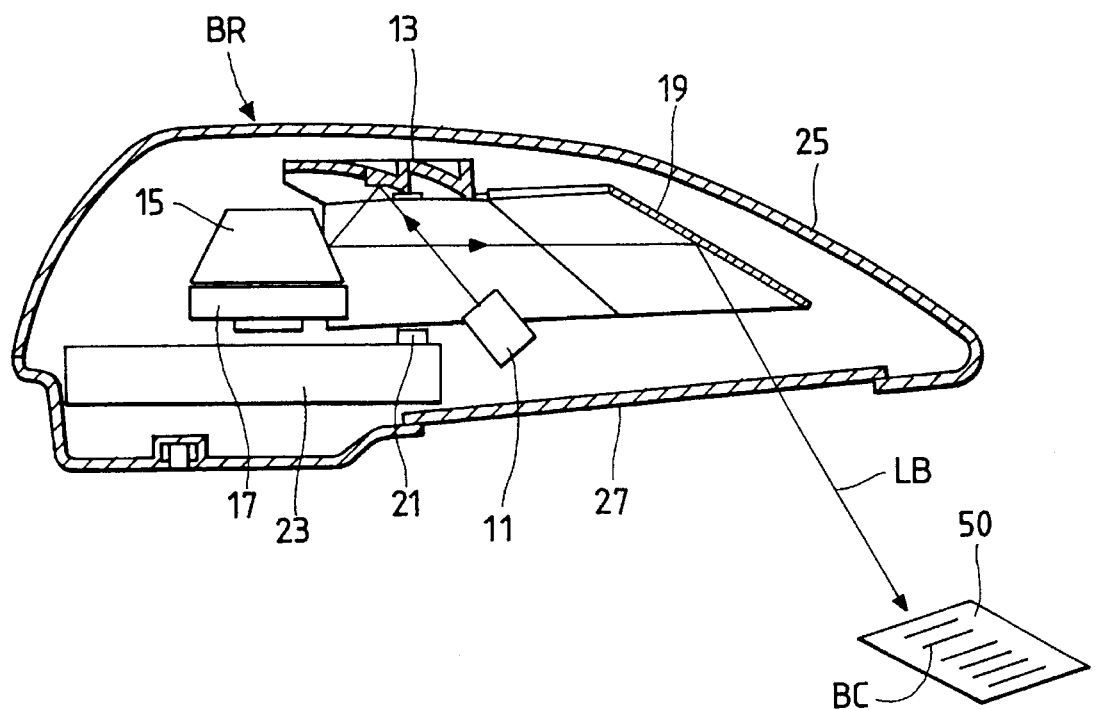
FIG. 1 is a seasonal view schematically showing a structure of an optical information reading apparatus according to a preferred embodiment of the present invention, wherein the present invention is applied to an overhead-type bar code reader.
Figure 2:
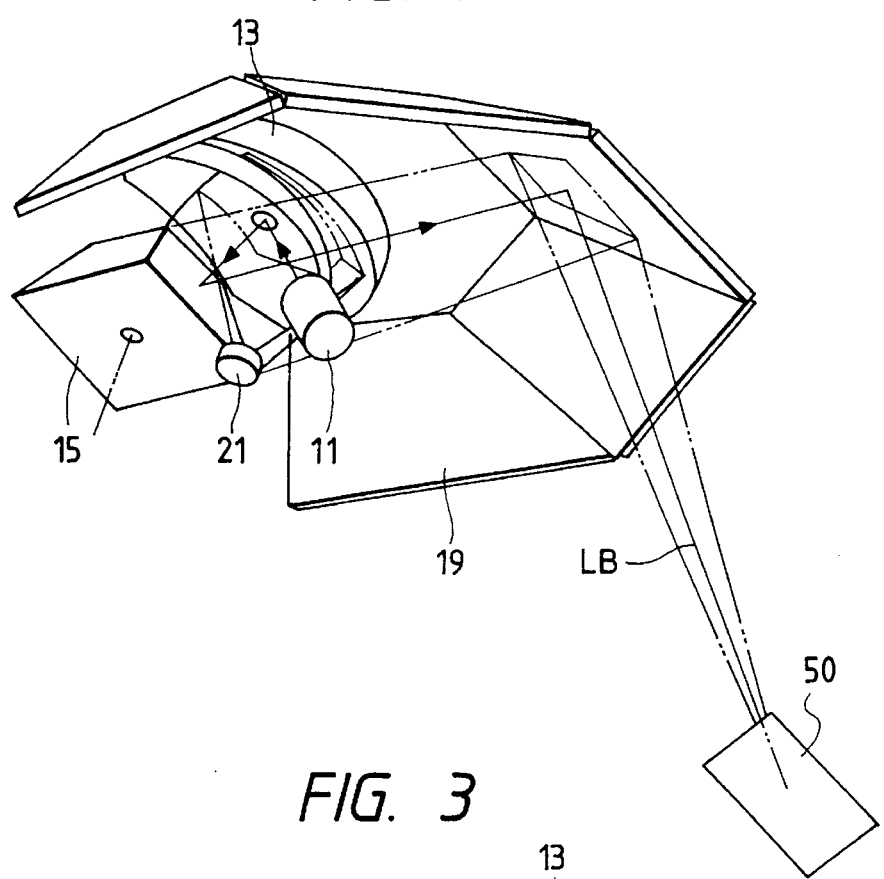
FIG. 2 is a perspective view showing an optical system incorporated in the bar code reader shown in FIG. 1.

FIG. 1 is a sectional view schematically showing a structure of the overhead-type bar code reader BR according to the preferred embodiment, and FIG. 2 is a perspective view showing an optical system of the bar code reader BR shown in FIG. 1.

As shown in FIGS. 1 and 2, the bar code reader BR has a casing 25 which includes therein a light source 11 for emitting a laser beam LB, a concave mirror 13, a rotating mirror 15, a motor 17, a pattern mirror 19 having reflecting surfaces arranged essentially in parallel with a reflecting surface of the rotating mirror 15, a light-receiving sensor 21 having a light-receiving surface orienting in a direction essentially the same as a direction of radiation of the laser beam LB effected by the light source 11, a recognition circuit 23 and so forth. The casing 25 is provided with a transparent reading window 27.

The laser beam LB radiated from the light source 11 is incident on a flat or planar portion of the concave mirror 13. The concave mirror 13 will be described later in detail. The laser beam LB reflected on the planar portion of the concave mirror 13 advances to the rotating mirror 15 driven by the motor 17. At the rotating mirror 15, the laser beam LB is reflected and converted to a scanning light. The scanning laser beam LB is received on the pattern mirror 19 to have a given scanning pattern, and then directed toward the outside of the bar code reader BR via the reading window 27 so as to be applied or irradiated onto an object 50 to be read which bears an optical information, such as a bar code BC to be read.

The laser beam LB applied onto the object 50 is reflected as a signal light having a light intensity which depends on reflectivity of an applied or scanned portion of the object 50. The signal light advances to the pattern mirror 19 via the reading window 27, then to the rotating mirror 15 and then to a concave portion of the concave mirror 13 to be reflected and converged onto the light-receiving sensor 21. The light-receiving sensor 21 produces an electric signal depending on an intensity of the received signal light so that the scanned optical information is captured in the form of electric signals. As appreciated, a level of the electric signal is indicative of an intensity of the received signal light. The electric signals are input into the recognition circuit 23 where the input analog signals are amplified, converted into digital or binary data, and then decoded in the known manner, so that the optical information is fully interpreted.

Now, the concave mirror 13 which features the bar code reader BR of the preferred embodiment will be described in detail hereinbelow.

Figure 3:
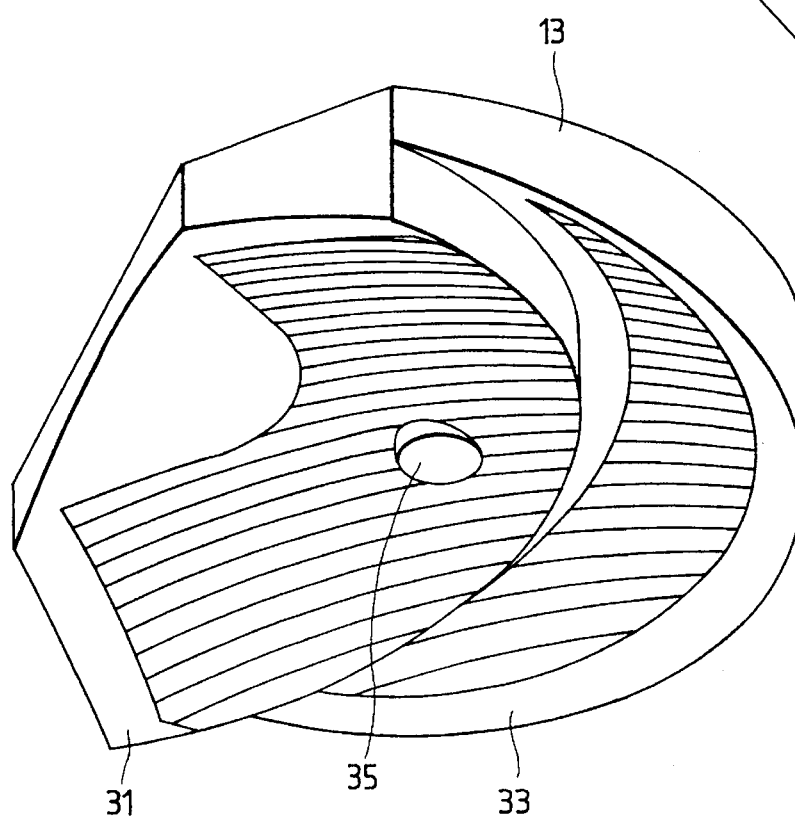
FIG. 3 is a perspective bottom view showing a concave mirror used in the optical system shown in FIG. 2.

FIG. 3 is a perspective bottom view showing the concave mirror 13, that is, the concave mirror 13 is seen from obliquely below. The concave mirror 13 includes a first concave portion 31, a second concave portion 33, and a planar portion 35 formed at a portion of the first concave portion 31. The first concave portion 31 is located closer to the rotating mirror 15 than the second concave portion 33. The concave mirror 13 is arranged at a position obliquely above the rotating mirror 15, and the first and second concave portions 31 and 33 and the planar portion 35 are arranged to confront the reflecting surface of the rotating mirror 15. In FIG. 3, hatched portions represent effective regions of the concave mirror 13 for receiving the signal light from the rotating mirror 15.

The concave mirror 13 is arranged such that reflection optical axes of the first and second concave portions 31 and 33 are set offset relative to a reflection optical axis of the planar portion 35. Specifically, assuming that light beams are emitted from one given point and reflected on the first and second concave portions 31 and 33 and the planar portion 35, respectively, the light beams reflected on the first and second concave portions 31 and 33 are set to reach the same point, while the light beam reflected on the planar portion 35 is so set as not to reach that point.

Further, the first and second concave portions 31 and 33 are so set as not to be included in the same ellipsoidal surface of revolution, that is, they are arranged in two steps. The advantage of this arrangement will be described hereinbelow with reference to FIGS. 4 and 5.

Figure 4:
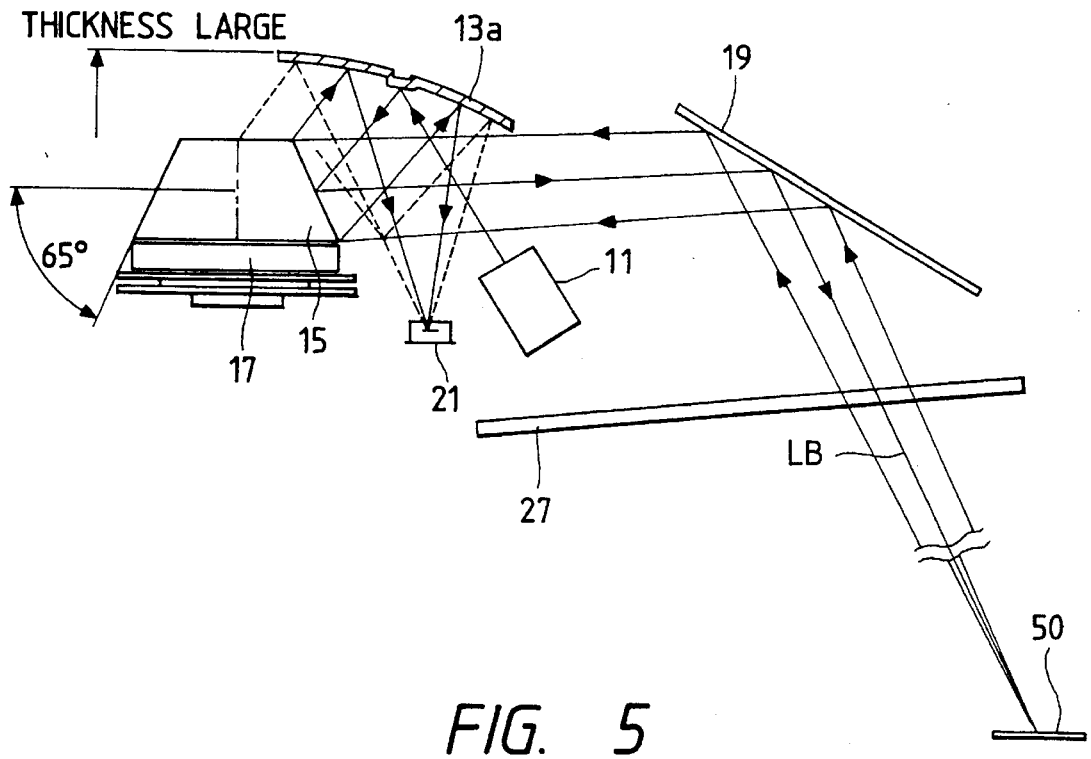
FIG. 4 is a diagram for explaining an optical system incorporating a concave mirror arranged in one step.
Figure 5:
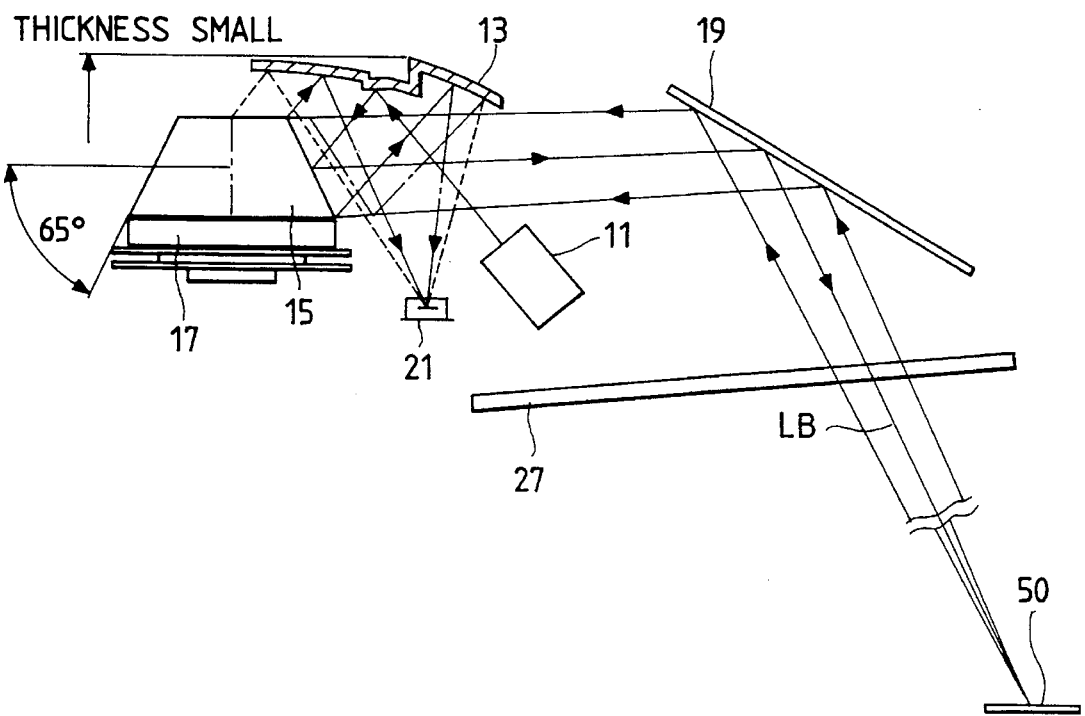
FIG. 5 is a diagram for explaining an optical system incorporating a concave mirror arranged in two steps according to the preferred embodiment.

In this preferred embodiment, an inclination of about 65° is set for the reflecting surface of the rotating mirror 15 relative to a plane perpendicular to a rotation axis of the rotating mirror 15 so as to ensure a sufficient scanning angle range, although it may be possible to set the inclination to another value less than 90°. Under the circumstances, when a concave mirror 13a arranged in one step is used as shown in FIG. 4, a dimension of the concave mirror 13a in a thickness direction of the bar code reader should be set so large as to make it difficult to realize a maximum reduction in thickness of the optical system and thus the bar code reader. On the other hand, when the concave mirror 13 arranged in two steps is used as shown in FIG. 5, a dimension of the concave mirror 13 in the foregoing thickness direction can be reduced to contribute to such reduction in thickness.

A relationship between the first and second concave portions 31 and 33 will be described further in detail with reference to Fig. 6.

Figure 6:
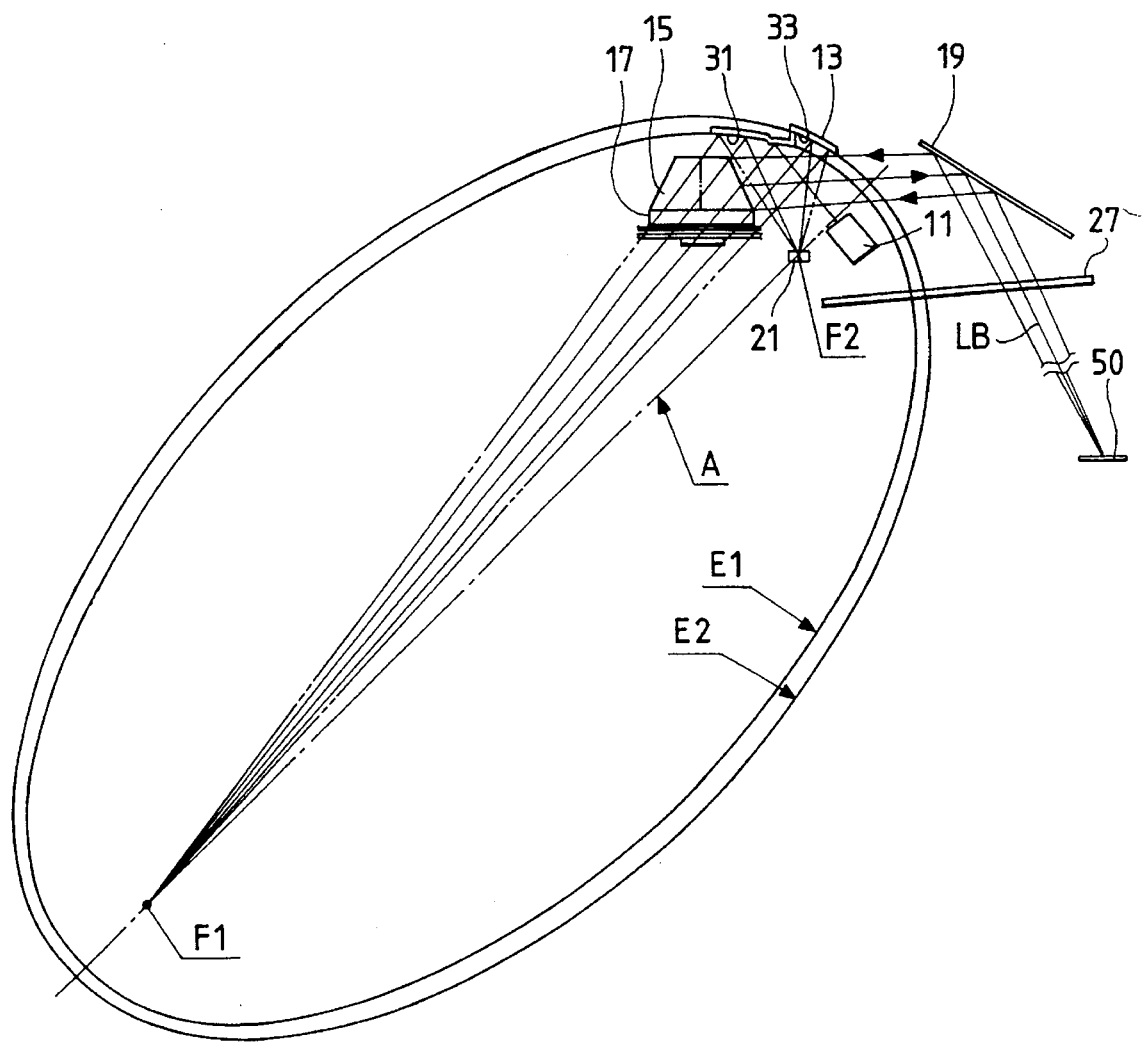
FIG. 6 is a diagram for explaining a relationship between first and second concave portions of the concave mirror according to the preferred embodiment.

As shown in FIG. 6, the first concave portion 31 forms a portion of a first ellipsoidal surface of revolution E1 and the second concave portion 33 forms a portion of a second ellipsoidal surface of revolution E2. The first and second ellipsoidal surfaces E1 and E2 share focal points F1 and F2 and a rotation axis A. As appreciated from FIG. 6, diameters of the second ellipsoidal surface E2 are set greater than those of the first ellipsoidal surface E1.

In FIG. 6, the focal point F2 is located at a position of the light-receiving sensor 21, and the focal point F1 is located at the farmost position within a readable area where the bar code is located when the optical path is developed in a straight line. Accordingly, the maximum condensing efficiency is ensured for the light from the farmost position where a light-receiving solid angle is minimum, while increments in the amount of received light, which would be otherwise caused as the bar code approaches the bar code reader BR, is canceled due to deviation in converging points of the light which is caused it approaches the bar code reader BR. This is effective for reducing a variation range or a dynamic range of the signal light intensity at the light-receiving sensor 21.

As appreciated, the focal points F1 and F2 are set at conjugate points on the rotation axis A which is an axis of symmetry of a rotation-symmetrical image formation system.

The concave mirror 13 is produced by depositing an aluminum reflecting film on a molded resin product. Usage of the molded resin product makes it easy to realize even a complicated configuration of the concave mirror 13, such as, the foregoing two-step structure with the integral planar portion 35.

According to the bar code reader BR of this preferred embodiment, as described above, the concave mirror 13 is so arranged that the reflection optical axes of the first and second concave portions 31 and 33 are set offset relative to the reflection optical axis of the planar portion 35. Accordingly, as shown in FIG. 1, the light source 11 and the light-receiving sensor 21 can be arranged with a given proper interval therebetween in a longitudinal direction of the bar code reader BR, that is, they can be arranged substantially on the same plane which is perpendicular to the thickness direction of the bar code reader BR. This contributes to the reduction in thickness of the bar code reader BR. On the other hand, in the conventional structure shown in FIG. 9A, since the reflection optical axes are essentially not offset as compared with the foregoing preferred embodiment, the light source and the light-receiving sensor have to be arranged with a given interval therebetween in the thickness direction of the apparatus. This disables the reduction in thickness of the apparatus.

Figure 9A:
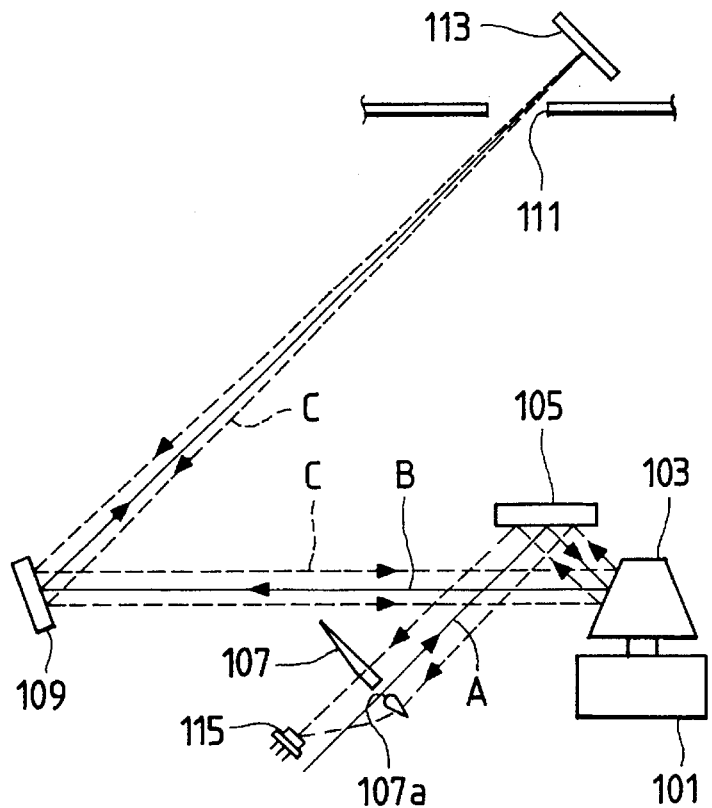
FIG. 9A is a diagram for explaining a conventional optical system of an optical information reading apparatus, wherein a ceiling mirror is incorporated.
Figure 9B:
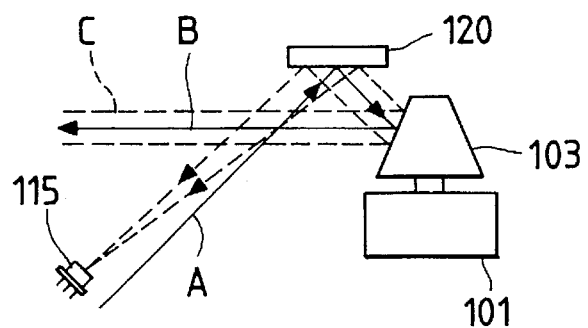
FIG. 9B is a diagram for explaining another conventional optical system of an optical information reading apparatus, wherein a reflection hologram is incorporated.

Further, since the concave mirror 13 works to converge the signal light from the rotating mirror 15, the condenser lens 107 shown in FIG. 9A is not required. This can reduce an optical path and thus also contributes to the reduction in size or thickness of the bar code reader BR. Moreover, since the concave mirror 13 is free of the foregoing problem caused by a variation in laser beam wavelength as opposed to the reflection hologram 120 shown in FIG. 9B, the semiconductor laser can be used as a light source. This also contributes to the reduction in size or thickness of the bar code reader BR.

Further, since the concave mirror 13 is arranged in two steps as shown in FIG. 5, a dimension of the concave mirror 13 in the thickness direction of the bar code reader BR can be reduced so that the optical system and thus the bar code reader BR can be reduced in thickness.

Further, since the light-receiving sensor 21 is arranged with its light-receiving surface orienting toward the inside of the casing 25, disturbance light emitted from external fluorescent and/or incandescent lamps and the like and introduced into the casing 25 via the reading window 27 are prevented from being incident directly onto the light-receiving sensor 21. This reduces adverse influence due to the disturbance light.

On the other hand, a Fresnel reflecting mirror is known as a thin-type condenser reflecting mirror and can be used instead of the concave mirror 13 on a theoretical basis. However, on a practical basis, it is very difficult to manufacture it. The reason will be described hereinbelow with reference to FIGS. 7 and 8.

Figure 7:
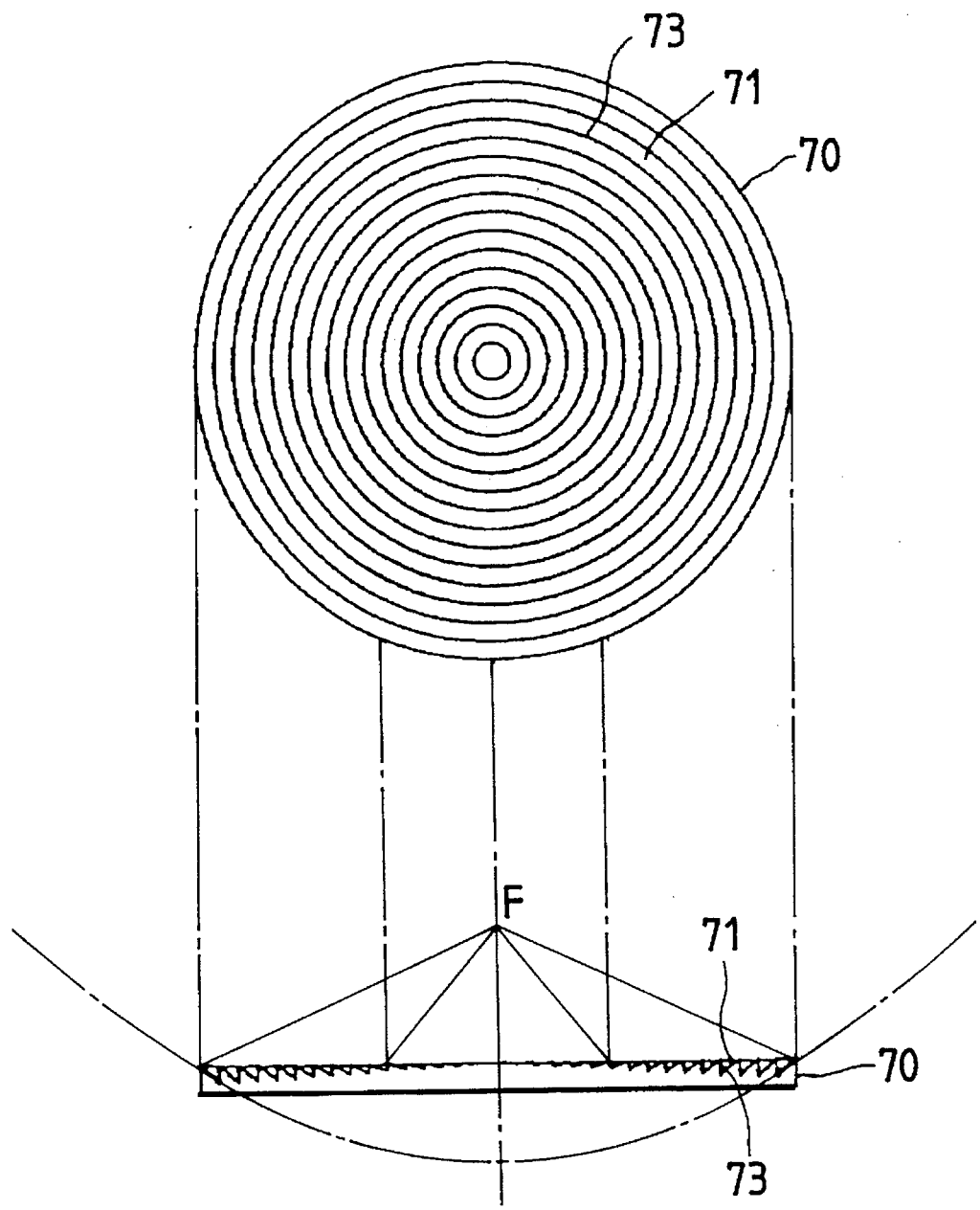
FIG. 7 is a diagram for explaining a structure of a general Fresnel reflecting mirror.

As shown in FIG. 7, a general Fresnel reflecting mirror 70 is formed by a number of concentric grooves 71 like a Fresnel lens. Each groove 71 has a groove surface 73. As seen from a sectional diagram of the Fresnel reflecting mirror 70 in FIG. 7, the groove surfaces 73 have different angles, respectively. On the other hand, it is still easy to machine out the concentric grooves 71 having such different-angled groove surfaces 73, using a rotating cutter or the like.

The grooves 71 of the Fresnel reflecting mirror 70, however, can be set concentric with each other only when each of reflecting surfaces of the Fresnel reflecting mirror 70 forms a portion of a solid of revolution and further a straight line including a center of the Fresnel reflecting mirror 70 and a focal point F thereof is perpendicular to a reference surface defined by the grooved surface of the Fresnel reflecting mirror 70, as shown in FIG. 7.

Figure 8:
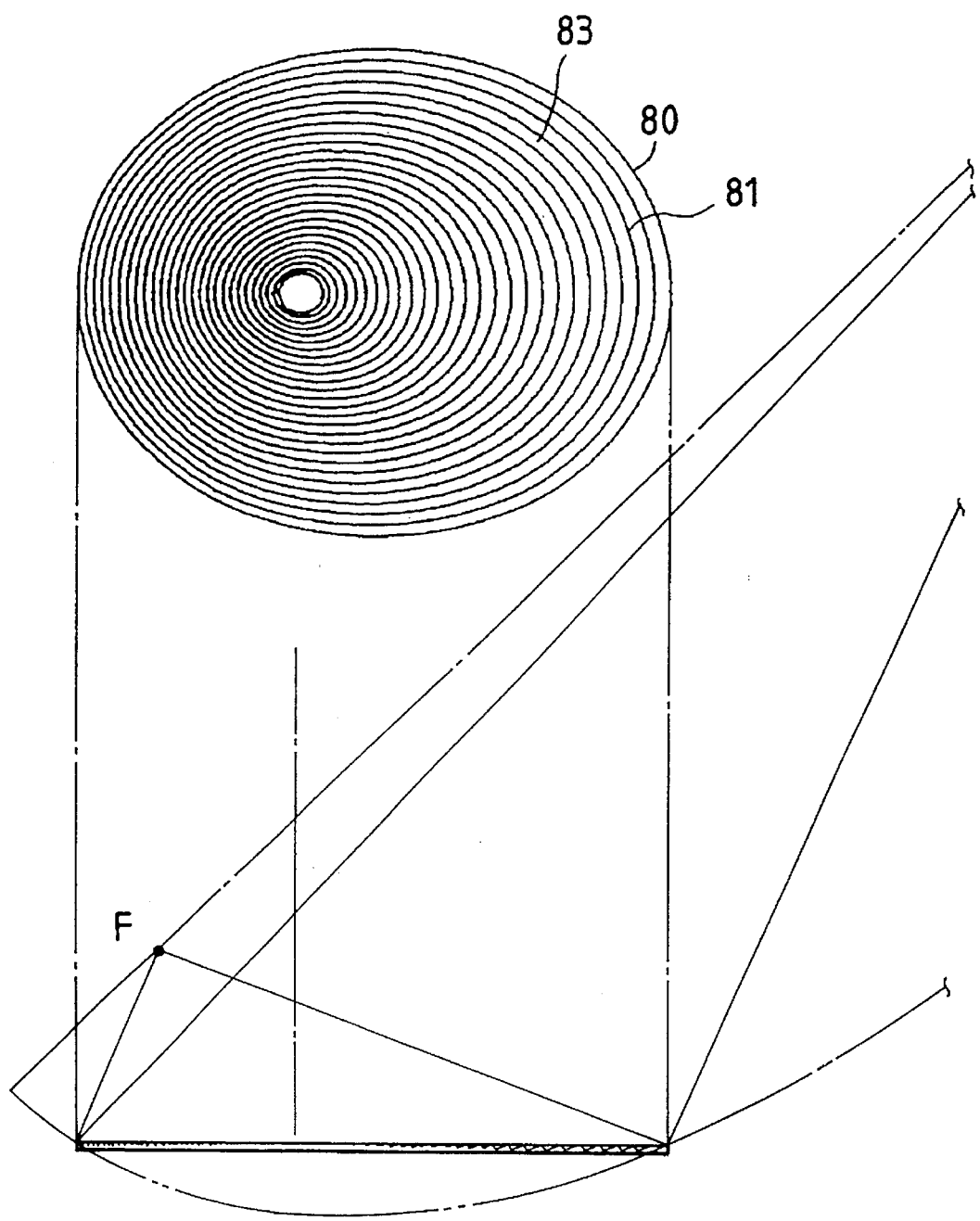
FIG. 8 is a diagram for explaining a structure of a Fresnel reflecting mirror which is equivalent to the concave mirror according to the preferred embodiment.

FIG. 8 shows a Fresnel reflecting mirror 80 equivalent to the concave mirror 13, wherein the foregoing straight line is not perpendicular to a reference surface of the Fresnel reflecting mirror 80. Accordingly, elliptic grooves 81 are required instead of the circular grooves 71. In this case, even in one groove 81, an angle of a groove surface 83 is not constant, but changes depending on a position in the groove 81. This makes it very difficult to machine out such a groove surface 83 using the rotating cutter. Only one focal point F of the two focal points of the Fresnel reflecting mirror 80 is shown in FIG. 8. Focal point F is equivalent to focal point F2 shown in FIG. 6.

On the other hand, in the foregoing preferred embodiment, as shown in FIG. 6, the concave mirror 13 comprises the first concave portion 31 forming a portion of the first ellipsoidal surface E1 and the second concave portion 33 forming a portion of the second ellipsoidal surface E2. Accordingly, the first and second concave portions 31 and 33 may be first machined out independently of each other using the rotating cutter, and then combined with each other to form the concave mirror 13. When using the foregoing molded resin product, a mold for forming such a molded resin product may be prepared in the manner as described above.

It is to be understood that this invention is not to be limited to the preferred embodiments and modifications described above, and that various changes and modifications may be made without departing from the spirit and scope of the invention as defined in the appended claims.

For example, the concave mirror 13 may be arranged in three steps or more instead of arranging it in two steps. On the other hand, in case of using the foregoing molded resin product, the increment in number of the steps inevitably increases discontinuous portions between the steps where distortion is liable to occur so as to lower the condensing performance of the concave mirror 13. For this reason, the two-step structure in the foregoing preferred embodiment is considered to be most preferable on a practical design basis.

What is claimed is:

1. An optical information reading apparatus comprising:

an irradiating optical system for converting a laser beam emitted from a light source to a scanning light using a rotating mirror, and for applying said scanning light onto an object bearing optical information thereon to be read via a pattern mirror;

a condensing optical system for converging light reflected from said object onto a given focal point via said pattern mirror and said rotating mirror;

light-receiving means, arranged at said given focal point, for producing a light-receiving signal indicative of an intensity of said converged light reflected from said object;

recognition means for reading said optical information based on said light-receiving signal from said light-receiving means; and a concave mirror arranged near said rotating mirror, said concave mirror including:

a planar portion for reflecting said laser beam emitted from said light source to be incident on said rotating mirror, a concave portion for reflecting and converging said reflected light from said rotating mirror onto said light-receiving means arranged apart from said light source, said concave portion of said concave mirror including:

a first concave portion; and
            a second concave portion, said first concave portion being located closer to said rotating mirror than said second concave portion, said first concave portion forming a portion of a first ellipsoidal surface of revolution and said second concave portion forming a portion of a second ellipsoidal surface of revolution, said first and second ellipsoidal surfaces sharing a rotation axis and focal points located on said rotation axis, and second diameters of said second ellipsoidal surface being greater than first diameters of said first ellipsoidal surface.

2. The optical information reading apparatus according to claim 1, wherein:

said planar portion is provided within said first concave portion.

3. The optical information reading apparatus according to claim 1, wherein said concave mirror includes:

a molded resin product integrally forming an overall configuration of the concave mirror: and a reflecting film formed on a surface of said molded resin product.

4. The optical information reading apparatus according to claim 1, wherein:

said rotating mirror has a reflecting surface having an inclination which is smaller than 90° relative to a plane perpendicular to a rotation axis of said rotating mirror.

5. The optical information reading apparatus according to claim 4, wherein:

said concave mirror is arranged at a position obliquely above said rotating mirror.

6. The optical information reading apparatus according to claim 1, wherein:

said pattern mirror has reflecting surfaces which are arranged essentially in parallel with a reflecting surface of said rotating mirror.

7. The optical information reading apparatus according to claim 1, further comprising:

a casing having arranged therein said light source, said rotating mirror, said pattern mirror, said light-receiving means and said concave mirror, said casing having a window through which said light reflected from said object passes to said pattern mirror;

said light-receiving means including a light-receiving surface orienting in a direction other than toward said window.

8. The optical information reading apparatus according to claim 1, further comprising:

a scanning window through which said light reflected from said object passes to said pattern mirror;

said light source and said light-receiving means being proximate to each other and having respective surfaces on a plane which is parallel to a plane of a scanning window of said optical information reading apparatus.

9. The optical information reading apparatus according to claim 1, wherein:

said rotating mirror has a reflecting surface having an inclination which is about 65° relative to a plane perpendicular to a rotation axis of said rotating mirror.

* * * * *